UNITED STATES PATENT OFFICE.

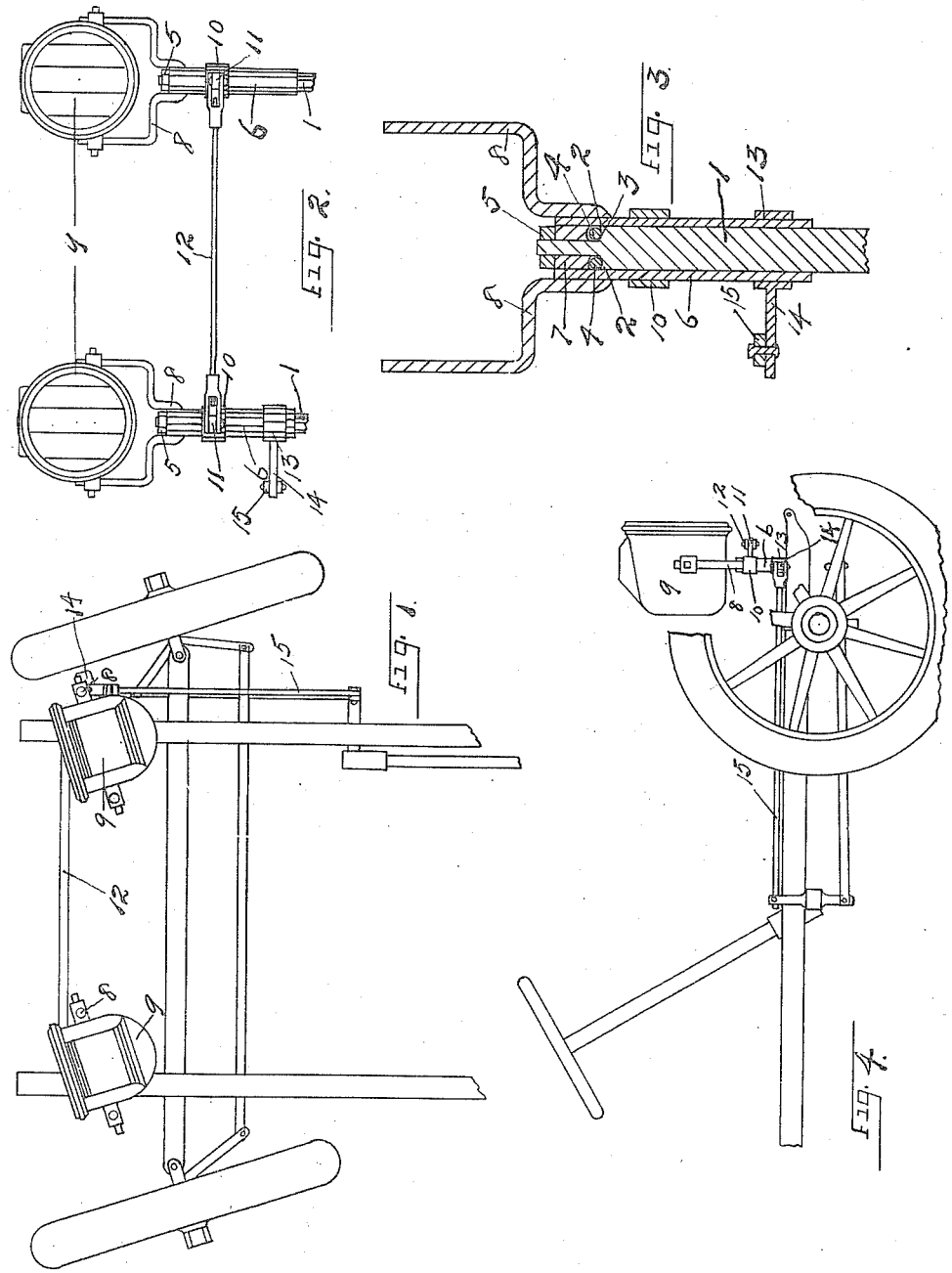

WALLACE R. PETTY, OF PRICE, UTAH.

DIRIGIBLE HEADLIGHT FOR VEHICLES.

1,051,352. Specification of Letters Patent. Patented Jan. 21, 1913.

Application filed April 5, 1912. Serial No. 688,800.

*To all whom it may concern:*

Be it known that I, WALLACE R. PETTY, a citizen of the United States, residing at Price, in the county of Carbon and State of Utah, have invented certain new and useful Improvements in Dirigible Headlights for Vehicles, of which the following is a specification.

My invention relates to dirigible head lights or lamps used on automobiles, and has for its object to provide an inexpensive head light or lamp pedestal mounted or carried on an automobile, and means of turning the pedestal, by which the rays of light from said lamp are directed or thrown in front of and in the direction in which the automobile is going. These objects I accomplish by the device illustrated in the accompanying drawings in which similar letters of reference indicate like parts therein and as described in the specification forming a part of this application.

Figure 1 is a fragmentary plan view of the chassis of an automobile with the lamps or head lights mounted on my pedestals and connected with the steering apparatus of said automobile. Fig. 2 is an elevation of the pedestals. Fig. 3 is a vertical section of one of the pedestals. Fig. 4 is a side elevation of the device and a fragmentary view of the front portion of an automobile.

My device consists of standards 1 which are mounted on the frame of an automobile either in front, or one on each side as desired. On the upper portion of each of said standards is formed a shoulder 2 having an annular V-shaped or troughlike groove 3 therein within which are carried friction balls 4. On the upper end of each of said standards is screwed a nut 5. Carried on each of said standards is a sleeve 6, within the upper end of which is secured the bearing 7, fitted on said friction balls 4. Upwardly extended lamp brackets 8 are attached to each of said sleeves 6 on which the lamps 9 are detachably secured. A band 10 is attached on each of said sleeves and has an extended arm 11 thereon. The arms 11 are connected by the pivoted turnbuckle 12, in order that the limited rotation of one of said sleeves will be the same as that of the other, and a turnbuckle is used to adapt the device to machines of different widths. On one of said sleeves is another band 13 similar to the bands 10 having an arm 14 extended therefrom at practically right angles to the said arms 11, to which arms 14 the steering mechanism of the automobile is connected by the swivel link 15.

As will be obvious the turning of the front wheels of the automobile by the steering mechanism will at the same time turn the lamps so that the light will be directed on the road in front of the wheels and on which the carriage will soon be running and not necessarily longitudinally with the car.

Having thus described my device I desire to secure by Letters Patent and claim:—

A dirigible head light for road vehicles consisting of vertical standards mounted on the frame of the vehicle; a sleeve carried and rotative on each of said standards; ball bearing supports for said sleeves; lamps mounted on said sleeves and movable therewith; bands secured around said sleeves; outwardly extended arms integral with said bands; a turnbuckle pivotally linking the arm of one sleeve to the arm of the other sleeve; and an adjustable link connecting one of said arms with the steering mechanism of said vehicle.

In testimony whereof I have affixed my signature in presence of two witnesses.

WALLACE R. PETTY.

Witnesses:
SAM RANEY,
W. R. WILLIAMS.